2,967,889

PROCESS FOR PREPARING ETHER-ALDEHYDES

Ellis R. White, Oakland, Calif., assignor to Shell Oil Company, New York, N.Y., a corporation of Delaware No Drawing. Filed Dec. 2, 1958, Ser. No. 777,614

6 Claims. (Cl. 260—602)

This invention pertains to an improved process for the preparation of beta-ether-substituted propionaldehydes by the addition of an alcohol to the olefinic double bond of acrolein.

It has long been known that alcohols can be added to the olefinic double bond of acrolein to form the corresponding beta-ether-substituted propionaldehydes. However, as a practical matter, preparation of these ether-aldehydes by this reaction has been found to be very difficult. Both the olefinic double bond and the aldehyde group of acrolein are highly reactive, so that a number of reactions are possible—and most have been found to occur—in a reaction system containing both an alcohol and acrolein. Thus, if acrolein is reacted with an alcohol in a reaction medium that is more than slightly acid, the predominant product is the acetal resulting from reaction of three molecules of the alcohol with one molecule of the acrolein, while if the reaction medium is more than slightly basic, various reactions involving condensation and/or polymerization of the acrolein and/or the alcohol occur to a major extent. It has been proposed to react the alcohol and acrolein in the presence of an amine as catalyst, in a reaction medium in which the pH is carefully controlled to maintain that medium in a neutral to slightly acid condition. The pH of a given medium is controlled by choosing an amphoteric amine which will provide the required pH, or by employing a basic amine and adding a carboxylic acid in the amount necessary to provide the required pH. The ether-aldehyde product ordinarily is recovered from the final reaction mixture by distillation techniques.

It has been found that these proposed processes are subject to serious disadvantages when employed on a large scale. In the reaction systems present in such methods, the amine salts of the carboxylic acids formed from the amines and the carboxylic acids often are unstable, decomposing into the precursor amines and carboxylic acids. Further, in many cases the amines and/or the carboxylic acids involved tend to be volatile under the conditions present during recovery of the ether-aldehyde product by distillation of the final reaction mixtures, so that the ether-aldehyde product almost always is contaminated by the amines and/or the acids. Thus, where there is involved an amine and/or acid whose boiling point is below, or very near, the boiling point of the product ether aldehyde, or, as often happens, where the amine and/or acid forms an azeotrope with a component or components of the final reaction mixture such that the amine and/or acid is distilled overhead with the product ether-aldehyde, it is very difficult to prevent contamination of the product by the amine and/or the acid. In such cases, at least an additional recovery step, to remove the amines and/or the acids from the products, is required to obtain pure products. Often, separation of the ether-aldehyde products from the amines and/or acids presents serious difficulties. In particular, amines catalyze reaction of beta-ether-substituted propionaldehydes to form various products, mostly of polymeric nature and of no known value. Thus, to obtain a pure product, either elaborate recovery procedures must be used to prevent contamination of the ether-aldehyde products by amines and/or acids, or substantial conversion of the ether-aldehyde products to useless polymeric materials during separation of the products from the contaminating amines must be accepted.

While contamination of the ether-aldehyde products by the amines and/or carboxylic acids involved can be avoided by employing amines and carboxylic acids which are not volatile, in the sense contemplated herein, or by employing a stable, non-volatile amphoteric amine, it is an unfortunate fact that the suitable non-volatile amines, and/or carboxylic acids and/or amphoteric amines are not readily available in substantial quantities at prices which make their use economically attractive. As a practical matter, therefore, one wishing to add an alcohol to acrolein by these proposed processes is forced to make a choice between two unattractive alternatives: (1) employment of a cheap, readily available catalyst, which will cause contamination of the product unless elaborate precautions to avoid the contamination are taken, or (2) employment of a catalyst which will not cause contamination of the product but which is so expensive as to be unattractive economically. As a practical matter, the proposed processes thus leave much to be desired.

I have now discovered a process for effecting addition of alcohols to the olefinic double bond of acrolein which avoids the aforementioned disadvantages of the prior art processes for effecting such additions. The new process is characterized by efficient addition of the alcohol to acrolein to yield the corresponding beta-ether-substituted propionaldehyde as substantially the only product, with virtually no undesirable, useless by-products being found. The new process employs stable, non-volatile catalysts, so that recovery of an uncontaminated product is easily accomplished.

Briefly stated, I have found that if an alcohol is reacted in liquid phase with acrolein in the presence of a mono-amine salt of a strong inorganic polybasic acid and an amine containing a polar structural moiety, substantially the only reaction which occurs is the addition of the alcohol to the olefinic double bond of the acrolein so that substantially the only product of the reaction is the beta-ether-substituted propionaldehyde corresponding to the alcohol. I have further found that these mono-amine salts are stable in the reaction mixture, and that both the amine and the acid are non-volatile, so that recovery of the product ether-aldehyde can be efficiently and conveniently effected by suitable distillation of the final reaction mixture obtained from reaction of the alcohol and the acrolein. My discoveries thus provide a process which lends itself admirably to the large-scale production of beta-ether-substituted propionaldehydes from alcohols and acrolein.

The process which embodies my discoveries effects selective addition of alcohols to the olefinic double bond of acrolein. It is preferred, of course, that the alcohol chosen in any particular instance be free from substituent groups other than the alcoholic hydroxyl group or groups which are reactive with acrolein under the process conditions, so that undesirable side reactions will not occur. For this reason and because of the desirability of the ether-aldehydes prepared therefrom, the process which I have discovered is of particular value for addition to acrolein of aliphatic alcohols containing only carbon, oxygen and hydrogen atoms. The two principal groups of these alcohols are the unsubstituted alcohols containing, in addition to one or more alcoholic hydroxyl groups, only carbon and hydrogen atoms, and the ether-alcohols—that is, alcohols containing one or more oxy(—O—) linkages. While the suitable alcohols may be either saturated or unsaturated, it is preferred that the alcohol used be free from acetylenic unsaturation; thus the saturated and olefinically—either mono- or poly-olefinically—unsaturated alcohols are preferred. The suitable alcohols can be either straight-chain or branched-chain in configuration, and may contain in their structure either or both of alicyclic or aromatic carbon-to-carbon moieties. While all of primary, secondary and tertiary alcohols are suitable, the alcohols containing at least one hydrogen atom bonded to a carbon atom to which an alcoholic hydroxyl group is bonded—that is, the primary and secondary alcohols—are most reactive, and are most suitable for this reason. The primary monohydric aliphatic alcohols are the most reactive. Examples of suitable alcohols thus include methanol, ethanol, n-propanol, n-butanol, n-hexanol, 1-octanol, 2-ethyl-1-hexanol, 1-decanol, lauryl, myristyl and cetyl alcohols and like high molecular weight aliphatic alcohols, such as tallow alcohols and fat alcohols, ethylene glycol, propylene glycol and like straight-chain primary alkanols, isobutyl alcohol, isoamyl alcohol, sec-butylcarbinol and like branched-chain primary alkanols, isopropyl alcohol, sec-butyl alcohol, sec-amyl alcohol, 2-octanol, 5-ethyl-2-nonanol, 7-ethyl-2-methyl-4-undecanol, 3,9-diethyl-6-tridecanol, cyclohexanol and like secondary alcohols, tert-butyl alcohol, tert-amyl alcohol and like tertiary alcohols, benzyl alcohol, phenethyl alcohol and like aralkyl primary alkanols, cyclohexylcarbinol, 2-cyclohexyl-ethan-1-ol and like alicyclic-substituted primary alkanols, allyl alcohol, crotyl alcohol, allylcarbinol, propenylcarbinol, cinnamic alcohol, 4-pentenol, oleyl alcohol, linoleyl alcohol, 2,4-pentadien-1-ol, 2,4-hexadienol and like alkenols and alkapolydienols, methoxymethanol, 2-methoxyethanol, ethoxymethanol, 2-butyloxyethanol, 2-(2-methoxyethoxy)-ethanol, 2-allyloxyethanol, 2-benzyloxymethanol, 2-phenoxyethanol, diethylene glycol and like ether-alcohols. Of particular interest because of the properties of the beta-aliphaticoxypropionaldehyde prepared therefrom are the primary monohydric aliphatic alcohols as herein described which contain from 1 to 25 carbon atoms, and of this group of alcohols, the alkanols of from 1 to 6 carbon atoms are of greatest interest.

Unique catalytic activity for effecting the addition of an alcohol to the olefinic double bond of acrolein, together with substantially complete stability and lack of volatility in the reaction mixtures encountered in that addition, has been found to be exhibited by the monoamine salts of strong inorganic polybasic acids and amines containing at least one polar moiety in their structure. By monoamine salt is meant the salt resulting from neutralization of one of the acidic hydrogen atoms of the acid by the amine.

In forming these salts, the suitable amines are those wherein there is at least one group containing at least one polar moiety in its structure which is bonded directly to an amino nitrogen atom, any remaining valence bond or bonds of an amino nitrogen atom being bonded to hydrogen or to hydrocarbon. By "a group containing at least one polar moiety in its structure" is meant a structural grouping which because of its structure and/or because of the presence of substituent groups thereon exhibits a dipole moment and which is substantially inert in the reaction mixtures involved. Excluded from these structures are those wherein only amino nitrogen-to-hydrocarbon structures are involved, since in these structures, any dipole moment is derived only from the structural moiety involving the amino nitrogen. Suitable polar structures involve hydrocarbon groups substituted by various substituents, such as halogen, nitro, amido, carboxyl, hydrocarbyloxy, carbalkoxy, cyano, formyl, hydroxy, and sulfo groups and the like, or hetero ring structures, such as the sulfolanyl group, and the like. For the sake of brevity, the suitable amines will be referred to hereinafter as "polar amines," Included within the term "polar amine" are the mono(polar) primary amines, the di-(polar) secondary amines, the tri(polar) tertiary amines, the (polar) hydrocarbon secondary amines, the di(polar) hydrocarbon tertiary amines and the (polar) di-hydrocarbon tertiary amines; also included are polyamines. The term "polar amine" thus defines amines of the formula:

$$(R-)_mN-(-R')_n$$

wherein R represents the polar group, R' represents hydrogen or a hydrocarbon group, or an amino group, $m$ is an integer from 1 to 3, and R' is an integer from 0 to 2, with the proviso that $m+n=3$. Because the primary and secondary amines of this class tend to be somewhat reactive with acrolein, the tertiary amines of this class are preferred. Also, because of their wide availability at low cost, the amines of this class wherein the polar group or groups is (are) hydroxyalkyl groups—i.e., the alkanolamines—are preferred. In these amines the alkyl moiety of the hydroxyalkyl group may be of straight-chain or of branched-chain configuration, and the hydroxy group can be in any position on the alkyl moiety. Preferably, however, the hydroxy group and the amino nitrogen atom are not bonded to the same carbon atom of the alkyl moiety, since these alpha-amino alcohols (otherwise aldehyde ammonias) tend to be unstable. In these amines, where more than one hydrocarbon group is present, the hydrocarbon groups may be the same or they may be different, and they may be of the same character—e.g., aliphatic or aromatic—or they may be of different character. The hydrocarbon group or groups can be aliphatic in character, or they can be aromatic in character. The aliphatic hydrocarbon groups may be of straight-chain or of branched-chain configuration, and they may be saturated or they may be unsaturated. Preferably the hydrocarbon group or groups are free from acetylenic unsaturation. If but one alkanolamine group is present, the remaining two valence bonds of the amino nitrogen atom may be bonded to the valence bonds of an alkylene, or similar divalent group, so that the two valence bonds of the nitrogen atom are bonded together by a carbon-to-carbon chain, as in an amine such as N-hydroxyalkyl morpholine.

The preferred alkanol amines are tertiary amines, including those containing three hydroxyalkyl groups, including, for example, tri(hydroxymethyl)amine, tri(2-hydroxyethyl)amine, hydroxymethyl di(2-hydroxyethyl)-amine, hydroxymethyl 2-hydroxyethyl 2-hydroxypropyl-amine, tri(4-hydroxybutyl)amine, and the like. Examples of suitable tertiary alkanol amines also include those wherein two of the hydrogen atoms of the amino group have been replaced by a hydrocarbon group, including those wherein one or both of the hydrocarbon groups are alkyl, such as methyl, ethyl, n- or isopropyl, n-, sec-, or tert-butyl, benzyl, phenethyl, styryl, cyclohexylmethyl, or the like, or alkenyl, such as allyl or crotyl or the like, or aromatic, such as the phenyl group, or alkyl-substituted or alkenyl-substituted phenyl groups, such as the methylphenyl group or the allylphenyl group, or the like, or cycloalkyl, such as the cyclohexyl, cyclooctyl, the methylcyclohexyl or ethylcyclohexyl, or phenylcyclohexyl groups, or the like. Specific examples of these amines include 2-diisopropylaminoethan-1-ol, 2-dimethylamino-ethan-1-ol, 3-diethylaminopropan-1-ol, 2-dimethylamino-4-hydroxypentane, 1-dimethylaminopropan-2-ol, 1-diethylaminopropan-3-ol, 2-diethylaminopropan-1-ol, 1-dihexylaminobutan-2-ol, 1-diethylaminobutan-2-ol, 2-dipentylaminobutan-1-ol, 1-di-n-propylaminobutan-2-ol, 3-diisopropylaminobutan-1-ol, 1-diethylaminobutan-4-ol, 2-dimethylaminobutan-3-ol, 1-diisopropylamino-3-methylpropan-2-ol, 1-dihexylaminopentan-5-ol, 2-diphenylamino-ethan-1-ol, 3-dibenzylaminopropan-1-ol, dibenzylamino-ethan-1-ol, 2-ethyl-2-phenylaminoethan-1-ol, 2-dihexyl-aminomethanol, 2-diallylaminoethan-1-ol, 3-diallylamino-propan-1-ol, and the like. The preferred catalysts are those wherein each of the groups attached to the amino nitrogen atom contains from 1 to 7 carbon atoms. Likewise, the preferred catalysts are those wherein the hydroxyalkyl group or groups attached to the amino nitrogen atom are omega-hydroxyalkyl groups—that is, the hydroxy group is bonded to the carbon atom most distant in the alkyl chain from the carbon atom to which the amino nitrogen atom is bonded. Of the catalysts wherein the amine contains a hydrocarbon group or groups bonded to the amino nitrogen atom, it is preferred that the hydrocarbon group or groups be alkyl.

In forming the amine salts used as catalysts, the suitable acids are the strong inorganic polybasic acids. Of these acids, phosphoric acid and sulfuric acid are the most widely available at low cost. Of these two acids, phosphoric acid is preferred because the polar amine salts thereof exhibit a somewhat milder action than do the corresponding salts of sulfuric acid, and the milder activity often permits better control of the reaction.

The catalyst may be preformed—that is, the monoamine salt of the acid per se can be used—or the amine salt can be formed in the reaction zone. When this latter procedure is used, the catalyst conveniently is formed by reaction of the necessary amount of the amine with the acid in the alcohol reactant and then the acrolein is added to start the reaction. To form the monoamine salt, of course, one equivalent of the amine is added per mole (three equivalents) of phosphoric acid or per mole (two equivalents) of sulfuric acid.

Either a single amine salt, or a mixture of two or more of the amine salts may be used, as may be convenient.

According to my new process, a beta-ether-substituted propionaldehyde is prepared by simply bringing together acrolein and an alcohol in the presence of the amine salt catalyst and maintaining the resulting mixture under those conditions for a sufficient time to insure completion of the desired reaction.

It has been found that addition of the alcohol to the acrolein goes forward most effectively at temperatures of from about 20° C. to about 110° C., although temperatures above and below this range may in some cases be employed. The reaction rate increases with increase in temperature, so that the use of higher temperatures in some cases will be desirable to reduce the required reaction time. However, as the reaction temperature increases, the tendency of side reactions to occur also increases, and greater care is required to avoid such side reactions. For this reason reaction temperatures above about 130° C. will seldom be of advantage over somewhat lower temperatures. It has been found that reaction temperatures within the range of from about 60° C. to about 100° C., and particularly reaction temperatures of about 80° C. (e.g., from about 65° C. to about 95° C.) are especially desirable, inasmuch as at these temperatures the desired reaction proceeds to completion at practically feasible rates, but that virtually no side reaction occurs. By conducting the reaction at about 80° C., it has been found that the acrolein is converted to the corresponding beta-ether-substituted propionaldehyde as substantially the only product.

The reaction between the alcohol and the acrolein can be carried out at substantially atmospheric pressure, or moderately subatmospheric or superatmospheric pressures can be used, as may be desirable and convenient. When conducting the reaction within the preferred temperature range, use of substantially atmospheric pressure is usually most convenient.

Essential to substantially complete conversion of the acrolein to substantially only the desired ether-aldehyde product is the presence of an excess of the alcohol over the amount theoretically required to react with the acrolein charged. Theoretically, one mole of the alcohol reacts with one mole of acrolein. It has been found necessary in the new process to supply at least 1.5 moles of alcohol per mole of acrolein charged to the reaction mixture. Preferably, somewhat larger excesses of alcohol—e.g., 2.0 to 3.0 moles of alcohol, or even more, per mole of acrolein—are provided. Ordinarily no commensurate additional advantage accrues from the use of more than about 20 moles of alcohol per mole of acrolein, and in most cases it will be found desirable to use not more than 10 moles of alcohol per mole of acrolein.

Also essential to the desired reaction is the presence of a substantial amount of the catalyst. Thus, the concentration of catalyst in the reaction mixture must be at least about 1% in the reaction zone of the total weight of that mixture, and preferably the catalyst concentration is at least 2% of the weight of the reaction mixture. In many cases it will be found desirable to employ from about 5% to as much as 15% of the weight of the reaction mixture of catalyst. Ordinarily, however, a catalyst concentration in excess of about 20% of the weight of the reaction mixture will be found undesirable, since a greater concentration of catalyst does not result in additional advantages over lesser concentrations of catalyst, so that larger excesses of catalyst are economically unjustified, and also because the amine salt catalysts used in this new process will in some cases react to a certain extent with the acrolein. At catalyst concentrations below about 20% of the weight of the reaction mixture, such a reaction between the acrolein and the catalyst does not ordinarily occur to any significant extent; at higher catalyst concentrations, this side reaction may occur to a significant extent. In most cases, a catalyst concentration of about 5–10% of the weight of the reaction mixture will be found to give optimum results.

It has been discovered that the presence of a substantial amount of water in the reaction zone in many cases markedly enhances the activity of the polar amine salts as catalysts for addition of alcohols to the olefinic double bond of acrolein. Thus, there should be present in the reaction mixture water amounting to at least 1% of the weight of the reaction mixture, and preferably the water concentration is at least about 5% of the weight of the reaction mixture. In many cases, it will be found desirable to use considerably more water—in some cases, a water concentration of as much as 50% of the weight of the reaction mixture will be found essential to optimum reaction of the alcohol and acrolein. As a general rule, the amount of water used should be about 3.5 times the weight of the catalyst used. It will be found that when the reaction is carried out at the preferred temperatures—i.e., at from about 20° C. to about 50° C.—the presence of water in the reaction mixture will not complicate the desired reaction; while water can react with acrolein, this reaction does not proceed to a significant extent at these low temperatures under the process conditions used herein. Since this reaction can go forward at significant rates at higher temperatures, if higher temperatures are to be used, the amount of water present in the reaction zone should be kept to the smallest amount possible commensurate with obtaining the necessary degree of activity of catalyst used.

The order in which the alcohol and the acrolein are mixed is not in most cases critical. To insure a minimum of side reactions, however, the acrolein should not come into contact with the catalyst unless the alcohol reactant is present. Thus, desirably, one of two techniques is used: In one, the acrolein is mixed with the alcohol and the catalyst added; in the other, the catalyst is mixed with the alcohol and the acrolein added, preferably slowly and to the thoroughly stirred reaction mixture to prevent local high concentration of acrolein.

Preferably, molecular oxygen is excluded from the reaction zone—again to prevent undesirable side reactions involving acrolein.

Commercially available acrolein often contains a small amount (usually a fraction of one percent by weight) of a polymerization inhibitor, such as hydroquinone. While the presence of such a polymerization inhibitor is not essential in the process of this invention, the presence of such an inhibitor does not have a deleterious effect in that process and can be tolerated. In some cases, it may be desirable to add a small amount—e.g., 0.1–0.5 percent by weight—of such an inhibitor to the reaction mixture.

As will be evident from the foregoing description of the new process, that process can effectively and conveniently be conducted in either a batchwise or a continuous manner.

Upon completion of the reaction, the reaction mixture comprises the product ether-aldehyde, the catalyst, water, the excess alcohol used, and unreacted acrolein. While any of the usual methods for separating two materials can be used to effect separation of the product ether-aldehyde, it normally will be found to be most convenient to distill that ether-aldehyde from the final reaction mixture. To avoid reversion of the ether-aldehyde, the 'flashing' technique preferably is used—that is, the final reaction mixture is distilled rapidly at low pressure (and thus at low temperature) to remove the ether-aldehyde overhead, the catalyst remaining as bottoms product. Further purification of the ether-aldehyde, if necessary, again can be effected by any known method, but preferably is effected by distillation.

The foregoing constitutes a general description of the process of this invention. The following examples are set out for the purpose of illustrating application of that process in particular cases. It is to be understood that these examples are included only for the purpose of illustrating the invention, and are not to be considered as limiting the invention in any way not recited in the claims.

*Example I.—Beta-methoxypropionaldehyde*

A mixture of 2 moles of acrolein, 8 moles of methanol, 10 grams of monotriethanolamine phosphate and 11 milliliters of water were refluxed with stirring until the kettle temperature rose from room temperature to 65° C. Total reaction time: 6 hours. The product then was dropped into a steam-heated flask in which the pressure was maintained at 3 millimeters of mercury pressure. The volatile materials were condensed in a cold trap, leaving the catalyst as a residue in the flask. The overhead product then was distilled to remove unreacted acrolein and methanol therein. A part of the product was recovered as an azeotrope with water. This part of the product was dried by distilling out the water as an azeotrope with added benzene. There were obtained 44 grams of beta-methoxypropionaldehyde boiling at 71° C. under 150 millimeters' mercury pressure. Conversion of acrolein charged: 50%. Yield of beta-methoxypropionaldehyde from acrolein converted: 92%.

A similar conversion of acrolein and yield of beta-methoxypropionaldehyde was obtained when this experiment was repeated, but with substantially no water present in the reaction mixture.

*Example II.—Beta-ethoxypropionaldehyde*

Six moles of ethanol, two moles of acrolein inhibited with 0.2% wt. of hydroquinone, ten grams of monotriethanolamine phosphate and ten milliliters of water were refluxed until the kettle temperature rose from room temperature to 80° C. The mixture then was flash distilled to remove the catalyst and the catalyst-free mixture was fractionally distilled to remove unreacted ethanol and acrolein. 120 grams of beta-ethoxypropionaldehyde, boiling at 62° C. under 50 millimeters' mercury pressure, were obtained. Conversion of acrolein charged: 59%. Yield of beta-ethoxypropionaldehyde from acrolein converted: 94%.

*Example III.—Beta-isopropoxypropionaldehyde*

6 moles of isopropanol, 2 moles of acrolein, 10 grams of monotriethanolamine sulfate and 10 grams of water were refluxed in a nitrogen atmosphere until a kettle temperature of 77° C. was attained. This required 30 hours. The product then was flash distilled to remove the catalyst and the catalyst-free mixture was fractionally distilled to remove unreacted isopropanol and acrolein. 86 grams of beta-isopropoxypropionaldehyde, boiling at 66–68° C. at 50 millimeters' pressure mercury, were obtained. Conversion of acrolein charged: 37%. Yield of beta-isopropoxypropionaldehyde from acrolein converted: 82%.

*Example IV.—Beta-allyloxypropionaldehyde*

12 moles of allyl alcohol, 4 moles of acrolein inhibited with 0.2% w. hydroquinone, 20 grams of monotriethanolamine phosphate and 10 milliliters of water were refluxed to a kettle temperature of 85° C. 14 hours were required. The volatile materials then were flashed from the catalyst and then were fractionally distilled to remove unreacted allyl alcohol and acrolein. 205 grams of beta-allyloxypropionaldehyde, boiling at 82.5° C. at 50 millimeters' mercury pressure, were obtained. Conversion of acrolein: 45%. Yield of beta-allyloxypropionaldehyde from acrolein converted: 87%.

*Example V.—Beta-n-butoxypropionaldehyde*

6 moles of n-butanol, 2 moles of acrolein, 10 grams of monotriethanolamine phosphate and 10 milliliters of water were blanketed with carbon dioxide and heated under reflux until the kettle temperature rose to 90° C. That temperature then was maintained for a total of 9 hours. After flashing the mixture to remove the catalyst, there was recovered by distillation 99 grams of beta-n-butoxypropionaldehyde, boiling at 91° C. at 50 millimeters' mercury pressure. Conversion of acrolein: 38%. Yield of beta-n-butoxypropionaldehyde from acrolein converted: 81%.

By means of the process of this invention, beta-stearyloxypropionaldehyde is prepared by reacting stearyl alcohol with acrolein.

Suitably, pure acrolein may be used in the process of the invention. Equally suitably, commercially available acrolein may be used. Such acrolein usually contains small amounts of ketones (particularly acetone), aldehydes (particularly acetaldehyde and propionaldehyde), and water. In effecting addition of an alcohol to the acrolein, according to our invention, both the ketones and the aldehydes are substantially inert. The beta-ether substituted propionaldehyde product can be separated from the resulting mixture by suitable known methods. The effect of water in the reaction mixture has already been discussed.

I claim as my invention:

1. In a process for the production of a beta-aliphatic-oxypropionaldehyde composed of carbon, hydrogen and oxygen, wherein acrolein and an aliphatic alcohol of from 1 to 25 carbon atoms composed of carbon, hydrogen and oxygen containing only reactive hydroxyl are caused to react in the liquid phase in the presence of a catalyst, the improvement which comprises employing as the catalyst a monoamine salt of an acid selected from the group consisting of phosphoric acid and sulfuric acid and an alkanolamine having a hydroxyalkyl group of from 1 to 7 carbon atoms bonded to the amino nitrogen and having each of the remaining valences of the amino nitrogen satisfield by a member of the group consisting of hydroxyalkyl groups of from 1 to 7 carbon atoms, hydrocarbon groups of from 1 to 7 carbon atoms, and the hydrogen atom, and conducting the reaction in the presence of water, the amount of water being at least 1% of the combined weights of the alcohol and acrolein.

2. The improvement set out in claim 1 wherein the acid is phosphoric acid, and the amine is a tertiary amine.

3. The improvement set out in claim 2 wherein the amine contains at least one hydroxyalkyl group bonded directly to an amino nitrogen atom.

4. The improvement set out in claim 3 wherein the amine is a trialkanolamine.

5. The improvement set out in claim 4 wherein the amine is triethanolamine.

6. The improvement set out in claim 1 wherein the acid is sulfuric acid, and the amine is a tertiary amine.

References Cited in the file of this patent

UNITED STATES PATENTS

| | | |
|---|---|---|
| 2,694,732 | McTeer et al. | Nov. 16, 1954 |
| 2,694,733 | McTeer et al. | Nov. 16, 1954 |
| 2,704,298 | Bellringer et al. | Mar. 15, 1955 |